United States Patent
Hansl et al.

(10) Patent No.: US 9,421,580 B2
(45) Date of Patent: Aug. 23, 2016

(54) PICKING SYSTEM AND METHOD FOR PICKING ARTICLES

(71) Applicant: TGW Logistics Group GmbH, Wels (AT)

(72) Inventors: Rudolf Hansl, Linz (AT); Reinhold Lackner, Laakirchen (AT)

(73) Assignee: TGW Logistics Group GmbH, Wels (AT)

( * ) Notice: Subject to any disclaimer, the term of this patent is extended or adjusted under 35 U.S.C. 154(b) by 67 days.

(21) Appl. No.: 14/367,355

(22) PCT Filed: Dec. 21, 2012

(86) PCT No.: PCT/AT2012/050204
§ 371 (c)(1),
(2) Date: Dec. 17, 2014

(87) PCT Pub. No.: WO2013/090969
PCT Pub. Date: Jun. 27, 2013

(65) Prior Publication Data
US 2015/0114799 A1    Apr. 30, 2015

(30) Foreign Application Priority Data
Dec. 22, 2011 (AT) .................................. 1875/2011

(51) Int. Cl.
*B07C 7/04* (2006.01)
*B65G 15/22* (2006.01)
(Continued)

(52) U.S. Cl.
CPC . *B07C 7/04* (2013.01); *B65B 35/54* (2013.01); *B65G 1/1378* (2013.01); *B65G 15/22* (2013.01); *B65G 37/00* (2013.01)

(58) Field of Classification Search
CPC ........ B65G 1/1378; B65G 15/22; B07C 7/04; B65B 35/54
See application file for complete search history.

(56) References Cited

U.S. PATENT DOCUMENTS 3,670,867 A * 6/1972 Traube ................. B65G 1/1378
186/57
4,244,448 A * 1/1981 Matheny, III ........ B65G 1/1378
186/55

(Continued)

FOREIGN PATENT DOCUMENTS

CN      201094952 Y    8/2008
CN      101726722 A    6/2010

(Continued)

OTHER PUBLICATIONS

International Search Report of PCT/AT2012/050204, mailed Apr. 2, 2013.

*Primary Examiner* — Thomas Randazzo
(74) *Attorney, Agent, or Firm* — Collard & Roe, P.C.

(57) ABSTRACT

A picking system for picking articles from storage loading aids in order loading aids has first and second conveyor systems for supplying and discharging the storage loading aids and the order loading aids, and a picking station having diverting conveyor systems. The first diverting conveyor system connects a transfer section of the first conveyor system for the storage loading aids via a first transport path to a pick-up section of the second conveyor system. The second diverting conveyor system connects a transfer section of the first conveyor system for the other loading aids via a further transport path to a pick-up section of the second conveyor system for the order loading aids. During further transport of the loading aids along the transport paths in the region of the diverting conveyor, the leading ends of the loading aids always form the front end of the loading aids in the transport direction.

20 Claims, 8 Drawing Sheets

(51) Int. Cl.
*B65G 1/137* (2006.01)
*B65B 35/54* (2006.01)
*B65G 37/00* (2006.01)

(56) References Cited

U.S. PATENT DOCUMENTS

| | | | |
|---|---|---|---|
| 4,976,343 A | 12/1990 | Fuller | |
| 5,730,579 A | 3/1998 | Keck et al. | |
| 5,937,994 A * | 8/1999 | de Barbuat | B65G 1/1378 198/346.1 |
| 7,198,147 B2 | 4/2007 | Petrovic | |
| 7,766,151 B2 | 8/2010 | Schaefer | |
| 7,809,467 B2 * | 10/2010 | Schaefer | B65G 1/1378 700/216 |
| 8,327,609 B2 * | 12/2012 | Krizmanic | B65G 1/1378 414/266 |
| 8,335,585 B2 * | 12/2012 | Hansl | B65G 1/1373 414/267 |
| 8,480,347 B2 * | 7/2013 | Schafer | B65G 1/1378 414/266 |
| 8,666,536 B2 * | 3/2014 | Freudelsperger | B65G 1/08 700/214 |
| 8,707,658 B2 * | 4/2014 | Schafer | B65G 1/1378 414/267 |
| 8,839,945 B2 * | 9/2014 | Gruber | B65G 1/1378 198/370.06 |
| 2009/0288996 A1 * | 11/2009 | Shafer | B65G 1/1378 209/546 |
| 2010/0106297 A1 | 4/2010 | Inazumi et al. | |
| 2011/0130869 A1 * | 6/2011 | Linge | B65G 1/1378 700/218 |
| 2013/0223959 A1 * | 8/2013 | Koholka | B65G 1/137 414/267 |

FOREIGN PATENT DOCUMENTS

| | | | | |
|---|---|---|---|---|
| DE | 892 129 C | 10/1953 | | |
| DE | 24 45 650 A1 | 4/1976 | | |
| DE | 100 19 632 A1 | 10/2001 | | |
| DE | 10019632 A1 * | 10/2001 | | B65G 1/1378 |
| DE | 602 01 652 T2 | 10/2005 | | |
| DE | 10 2005 045 971 A1 | 4/2007 | | |
| DE | 603 08 498 T2 | 6/2007 | | |
| DE | 10 2010 010 305 A1 | 9/2011 | | |
| EP | 1 331 179 A1 | 7/2003 | | |
| EP | 1 452 462 A2 | 9/2004 | | |
| EP | 1 572 558 B2 | 3/2010 | | |
| EP | 2 327 644 A1 | 6/2011 | | |
| FR | 2 838 412 A1 | 10/2003 | | |
| JP | 54-131278 A | 10/1979 | | |
| JP | 54131278 A * | 10/1979 | | B65G 1/00 |
| JP | 2008/037567 A | 2/2008 | | |
| WO | 2006/137096 A1 | 12/2006 | | |
| WO | 2011/107385 A1 | 9/2011 | | |

\* cited by examiner

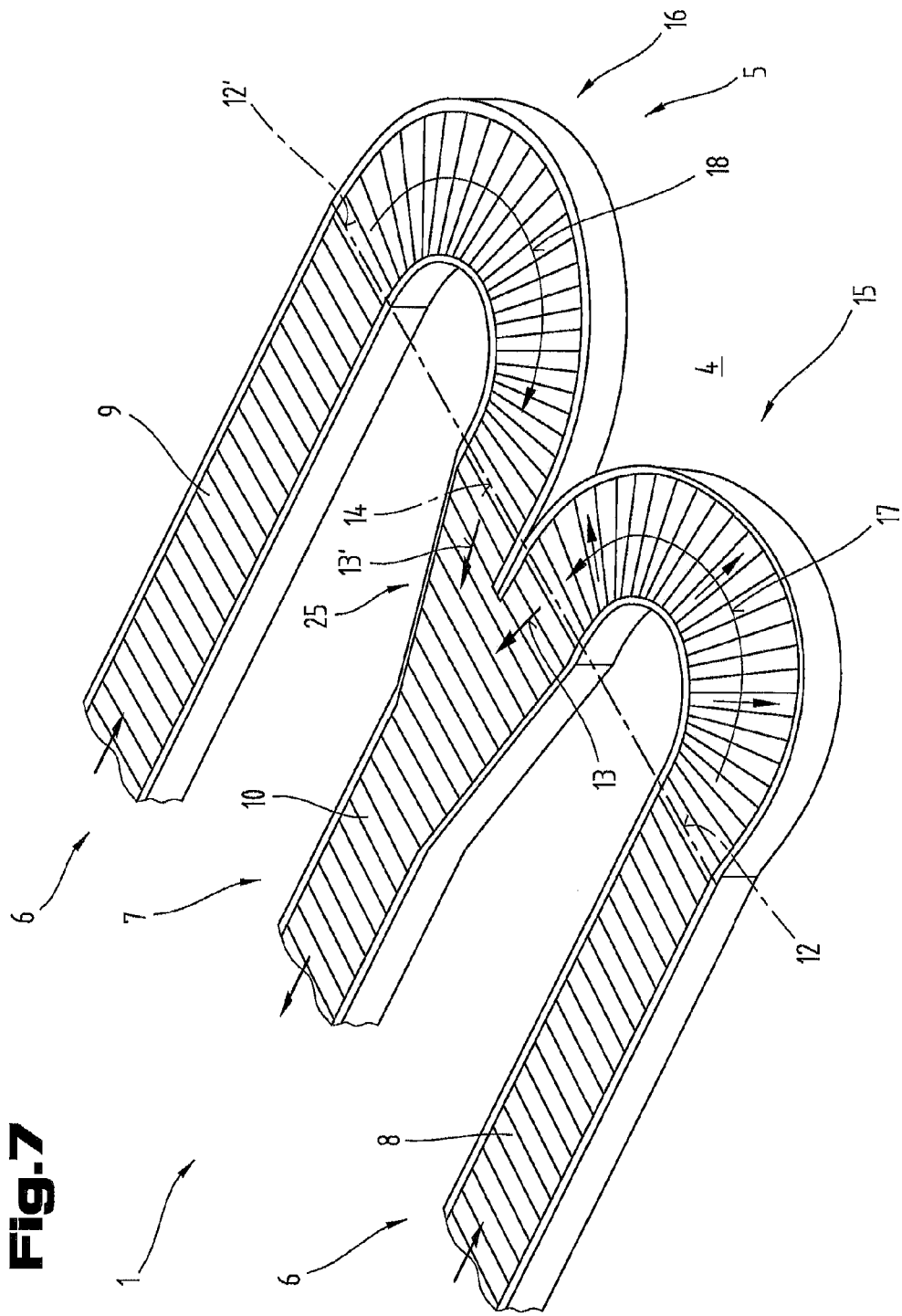

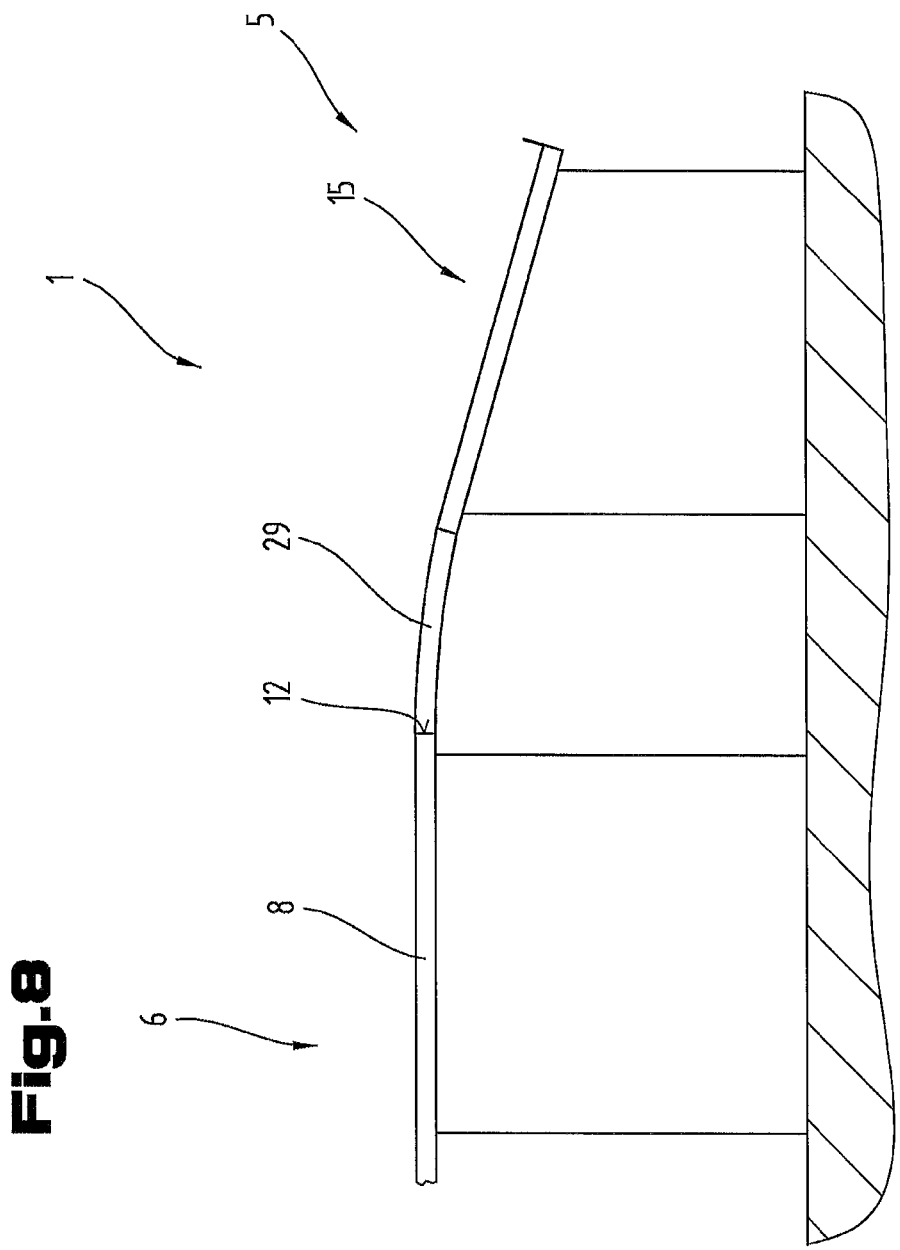

PICKING SYSTEM AND METHOD FOR PICKING ARTICLES

CROSS REFERENCE TO RELATED APPLICATIONS

This application is the National Stage of PCT/AT2012/050204 filed on Dec. 21, 2012, which claims priority under 35 U.S.C. §119 of Austrian Application No. A 1875/2011 filed on Dec. 22, 2011, the disclosure of which is incorporated by reference. The international application under PCT article 21(2) was not published in English.

BACKGROUND OF THE INVENTION

1. Field of the Invention

The invention relates to a method and an order-picking system for picking articles from storage loading aids into order loading aids by an order picker at an order-picking workstation according to picking orders.

2. Description of the Related Art

Document EP 1 331 179 A1 describes a commissioning system wherein the storage loading aids can be sorted and brought into the correct order while they are on their way from the storage area to the order-picking workstation. For this purpose, the commissioning system describes a storage area where the goods are stored. The commissioning system also comprises an area for commissioning the articles, including several order-picking workstations where the goods are removed from the storage loading aids and commissioned into the order loading aids. One variant of embodiment provides three conveyor devices running parallel with one another, in which case the order loading aids as well as the storage loading aids are supplied so that they are separated from one another at the two outer conveyor devices. The centrally arranged conveyor device serves to discharge the completely picked order loading aids as well as those storage loading aids that are no longer needed. The terminal ends of the three conveyor devices are connected by means of a transverse conveyor device forming the picking table. The order picker can pick the articles from a storage loading aid into an adjacent order loading aid. Another embodiment has two parallel conveyor devices each of which is provided for supplying and discharging storage loading aids and order loading aids, respectively. The terminal ends of these two conveyor devices are connected by a transverse conveyor device constituting the picking table. A commissioning bay is connected to or in the vicinity of the transverse conveyor device and is suitable for intermediately accommodating the order picking to be filled.

Document WO 2011/107385 A1 discloses a universal high-performance order-picking workstation for fast-moving items and slow-moving items. This order-picking workstation is configured for manual order-picking of articles from storage containers into at least one order container according to an order-picking order which can include a plurality of different articles. The storage containers can contain fast-moving item storage containers for fast-moving articles and slow-moving item storage containers for slow-moving articles, which are fed to the order-picking workstation together with the at least one order container. To this end, the individual storage containers are fed to the order-picking workstation in different levels, starting from own conveyor lines. The order containers are provided in a further conveyor level arranged underneath the storage containers in order to be able to pick the articles from the provided storage containers and place them in the order containers. The disadvantage of this embodiment is that different levels are required in order to be able to convey the storage containers as well as the order containers to the order-picking workstation. This requires high plant costs.

Document EP 1 572 558 B2 discloses a picking station and a method for order-picking. Order containers are made available in the region of the picking station, which order container is fed to a picking station by means of an own conveyor system. By means of the conveyor line arranged above, the storage containers are tilted at least in the working area of the order picker. This is carried out by means of a tilting device tilting into a tilted position the storage containers to be delivered into the working areas. The conveyor line furthermore comprises a tilt-back device for tilting the storage containers back from their tilted position. It is thereby possible to tilt the storage containers towards the order picker as they are passing through the picking station in order to allow the order picker to have a better view and more convenient handling of the articles. It is in this case disadvantageous that the scope of installations for the tilting device in the region of the order-picking workstation is high.

Document DE 892 129 B describes a method as well as a device for bringing load into an inclined position on transport lines, wherein the load is brought into an inclined position on a determined path. The conveying system comprises a plate conveyor having a single-stranded chain and plates mounted in hinges. The chain is guided across two sprocket wheels. The straight chain strand is in the upper portion supported in a sectional steel construction, and is in contact with the plates in the lower strand. Guiding these plates by means of hinges mounted to the chain can be carried out by rollers on guide rails, for example Their arrangement obligatorily causes that the inclined position is initiated, maintained on the predetermined path and canceled when this path has expired, and simultaneously causes and ensures that the plates are fed back together with the chain in the lower part of the system. This causes that the transport containers conveyed onto the closed or interrupted transport path are by individual coordinated members obligatorily inclined from the horizontal plane about an axis lying parallel with the conveying direction into an angle range of 60° with or without using the weight of the good, thereby considerably facilitating the removal of the conveying goods provided in the form of bottles. At the turning points of the chain, the guide of the plates is carried out by circulating guiding wheels. The disadvantage is that though the removal of the conveying good is facilitated, the picking station has an increased need for space.

Document DE 100 19 632 A1 describes an arrangement for transporting goods disposed on the storage loading aids for a storage area, whereby the goods are compiled to form picking units at order-picking workstation outside of the storage area along a transport path. Additionally, buffer places for receiving order loading aids are provided parallel to the transport path. In order to be able to commission the storage loading aids into the order loading aids, the order picker must remove the goods from the storage loading aids, perform a 180° rotation and place it in the therefor provided order loading aid(s) made available at the order-picking workstation.

Document JP 54 131278 A discloses an order-picking system for picking articles from storage loading aids into order loading aids by an order picker at an order-picking workstation For carrying out a picking order, the storage loading aids are transferred from a warehouse to a circulating conveyor system from where they are conveyed onto an auxiliary conveying device via a delivery device. Order-picking workstations where the storage loading aids are made available are provided at the auxiliary conveying device. Once the picking operation is completed, the storage loading aids are again discharged through the auxiliary conveying device from the order-picking workstations and conveyed back into the circulating conveyor system via the infeed diverter device. The order loading aids are made available at a circulating conveyor system. In order to be able to commission the storage loading aids into the order loading aids, the order picker must remove the goods from the storage loading aids, perform a 180° rotation and place it in the order loading aid(s).

Document WO 2006/137096 A1 describes automatic warehouse system with modular sectional structure having several levels one above the other as well as conveying paths arranged one next to the other in each level. Order-picking workstations are additionally provided.

Document EP 2 327 644 A1 describes an order-picking system having an order-picking workstation. In this case, a first conveyor system for the order loading aids is situated in front of the order picker, which conveyor system extends in transverse direction with respect to the order picker. A second conveyor system for storage loading aids is arranged on the side of the first conveyor system facing away from the order picker and arranged in two conveyor levels arranged one above the other. The order picker is therefore required to bend across the first conveyor system in order to be able to remove goods from the storage loading aids and place them into the order loading aids made available in front of him.

Document DE 2445650 A1 describes a conveyor plant where carriers circulate on double-strand tracks. At the front ends of the conveyor plant, these carriers are deflected by an arc-shaped deflection device about an angle of 180°. Due to gravity, the transport motions in the deflection device is carried out by supporting against ball casters arranged so as to slope.

Other conveying plants are known from DE 10 2005 045 971 A1, U.S. Pat. No. 4,976,343 A, U.S. Pat. No. 5,730,579 A and FR 2 838 412 A, which documents how only define a general prior art.

SUMMARY OF THE INVENTION

The underlying objective of the present invention is to propose an order-picking system as well as a method for order-picking articles by an order picker from storage loading aids into order loading aids, which system achieves a secure and ergonomic order-picking process despite lower requirements in terms of system installations.

This objective is achieved by the features and measures according to the invention. The advantages reside in the fact that it allows in the region of the order-picking station of the order-picking system the transport path to be always directed in the same direction as a result of specifically provided diverting conveyor systems in order to be able to easily provide the order picker with the required order loading aids as well as with the storage loading aids needed for a picking order in an exactly predetermined sequence. It is furthermore possible that also a synchronous transport process for several loading aids is carried out, thereby avoiding waiting periods. This results in an increased throughput rate and the thereto related picking rate. To this end, the diverting conveyor systems preferably form a common conveying or transport plane, whereby height offsets between the loading aids are avoided when the order-picking operation is carried out. It is thereby possible to remove the required article(s) in a simple removal operation and transfer them onto the respectively oppositely lying diverting conveyor system with the corresponding order loading aids. This causes that the order picker does not have to carry out far-reaching movements and thereto related bending movements in order to reach the storage loading aids, as it has been common with storage loading aids arranged one above the other and one behind the other. With one simple swivel movement, the order picker can now carry out the placement movement into the therefor provided order loading aid once the removing from the available storage loading aid has been carried out. A further result is that a great degree of noise reduction can be achieved, as no additional lifting movements, switching movements or suchlike are required in order to be able to make the loading aids available in the region of the order-picking station. Another result is that the safety of the order picker can be increased considerably, as there are no pinching and shearing strain points.

Of advantage are furthermore transport paths at least sections of which extend to be arcuate curved, as switching stations can thereby be avoided causing that there is a considerably lower effort in terms of control engineering and mechanics whilst the loading aids can be supplied to the order picker in a predefined position anyway.

A measure according to an embodiment is also advantageous as a rectangular plan view of the loading aids causes that the longer side edge always faces the order picker. It is thus possible that conveyor having smaller constructional widths might be sufficient in the supply and discharge region.

According to a measure based on another embodiment, the storage loading aid is conveyed starting from a first transfer section at a first incoming conveyor path along the first transport path to a first pick-up section at an accumulating conveyor and the order loading aid is conveyed starting from a second transfer section at a second incoming conveyor path along a second transport path to a second pick-up section at said accumulating conveyor and that afterwards, the storage loading aid and the order loading aid are conveyed by the accumulating conveyor onto a common conveyor.

Another embodiment is also advantageous as the space requirements for the arrangement of the conveyor systems are relatively low. Loading aids having a rectangular plan view furthermore allow a large degree of otherwise required conveying width of the conveyor systems to be saved.

Another embodiment is also advantageous as it is thereby possible to keep the space requirements as low as possible. It is furthermore easier to connect additional storage systems.

Another embodiment allows the order-picking workstation to be designed simple and ergonomic, and the supply and discharge of the loading aids to be carried out independent of the diverting conveyor systems.

Based on another embodiment a separated and always directed supply of storage loading aids as well as of order loading aids is achieved.

Another embodiment is also advantageous as thereby an order-picking system exhibiting a very high flexibility can be provided for carrying out the picking operations.

The design according to another embodiment bears the advantage that it additionally allows the required scope of equipment to be further reduced, thereby reducing further costs for purchase and operation. It is additionally possible to improve the accessibility for maintenance and repair.

Due to another embodiment is achieved that a central discharge of both loading aids can be carried out.

On the basis of another embodiment either of the two loading aids can be made available separated from the respective other one, and the loading aid(s) face the order picker with its/their preferably longer side edge while being on the transport path. Thereby the order-picking safety as well as the ergonomics of the order-picking workstation is increased.

Another embodiment is also advantageous as thereby a high flexibility of the discharge operation can be achieved, although one common conveyor is sufficient for the discharge operation.

Based on another embodiment a possibility is provided to directly discharge from the order-picking station those loading aids having a higher processing rate. Providing the inbound gate conveyor can allow a buffer or accumulation position to be created in order to be able to discharge also those loading aids having a lower processing rate from the order-picking station.

To this end, another embodiment provides advantageous results as thereby an even higher flexibility for the supply and discharge of the loading aids in the region of the order-picking station can be achieved.

Another advantageous embodiment provides the possibility that both loading aids are supplied to the order-picking workstation approximately centric or centrally arranged and to discharge them on the outside after they have passed the diverting conveyor systems.

On the basis of another embodiment the possibility to create an additional depositing area in the course of the transport path is provided. This may help to improve the efficiency of the entire order-picking system.

Another design increases the operator convenience for the order picker. This is due to the fact that, when transport containers are used as storage loading aids, the intervisibility to the article or articles to be picked from the storage loading aids is improved and furthermore, the removing operation for the order picker is made considerably more ergonomic. This can help to reduce the susceptibility to picking errors and furthermore, the order picker will not get tired so quickly.

Also advantageous is an embodiment as thereby a jerky transfer between the two conveying planes inclined to each other is avoided when the loading aids are transferred, which jerky transfer would otherwise cause a sudden change of position between the two conveying planes in case that there is a straight transition section. By providing a bow-shaped transition section it is possible to reduce or completely omit noise generation, since this results in a soft transition of the loading aids when they are transferred from the first conveyor system as well as when they are picked up onto the second conveyor system.

It is in this case possible to use another design as this allows the loading aids to be individually transported onwards in the region of the diverting conveyor systems by means of simple tools. It is thereby also possible to have a quick influence on the orientation of the conveying path. Furthermore, different loading aids, in particular their size and dimensions, can be taken into account.

Another design allows an even more individual possibility to transport the loading aids in the region of the diverting conveyor system. This allows the loading aids in the region of the diverting conveyor system to be additionally transferred, switched or subjected to other transport movements.

Another embodiment allows the loading aids to be conveyed along the additional guide elements and preferably so as to be in contact therewith.

BRIEF DESCRIPTION OF THE DRAWINGS

To provide a clearer understanding, the invention will be described in more detail below with reference to the appended drawings.

They show each in a highly schematic simplified diagram:

FIG. 7 is a further possible design of an order-picking system wherein the storage loading aid is conveyed so as to be inclined towards the order picker in the region of the diverting conveyor system;

FIG. 8 is a side view illustrating another possibility to design a conveyor line running so as to be inclined to the order picker in the region of the diverting conveyor system.

DETAILED DESCRIPTION OF THE PREFERRED EMBODIMENTS

Firstly, it should be pointed out that the same parts described in the different embodiments are denoted by the same reference numbers and the same component names and the disclosures made throughout the description can be transposed in terms of meaning to same parts bearing the same reference numbers or same component names. Also details relating to position used in the description, such as e.g. top, bottom, side etc. relate to the currently described and represented figure and in case of a change in position should be adjusted to the new position.

The following FIGS. 1 to 6 show different variants of arrangement as well as embodiments of an order-picking system 1, and all of them are based on the same idea, namely the loading aids to be transported.

Figure 1:
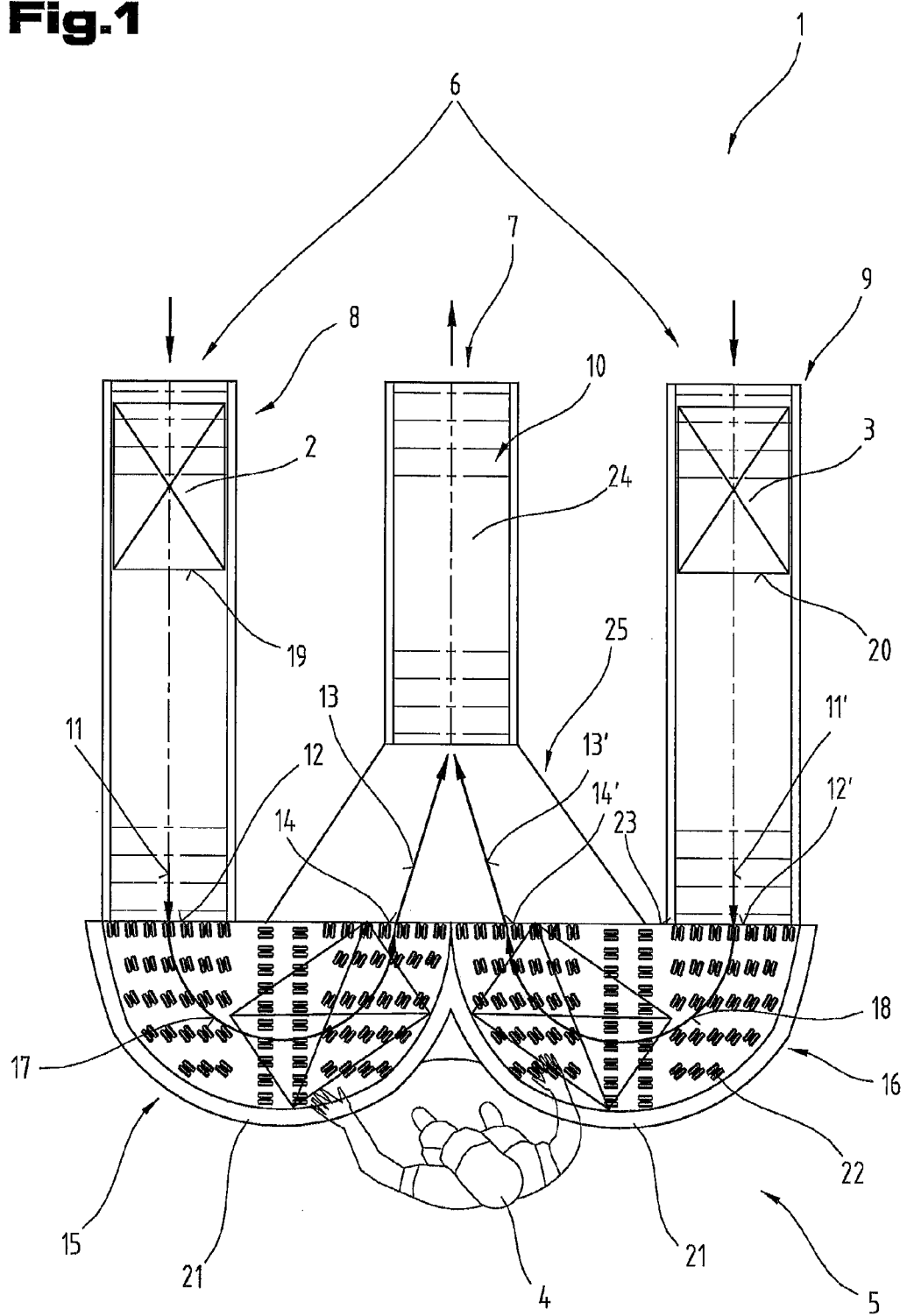
FIG. 1 is a plan view illustrating a first possible embodiment of an order-picking system.

FIG. 1 shows a possible embodiment of an order-picking system 1 for picking different articles from storage loading aids 2 into order loading aids 3, wherein an order picker 4 at an order-picking workstation removes the articles which are required according to picking orders from the storage loading aids 2 and places them in the corresponding order loading aids 3.

This being the case, the picking operation can e.g. be performed in such a way that the order loading aid 3 stays in the region of the order-picking workstation until the picking order has been processed completely. It is for this purpose also possible that several of the storage loading aids 2 containing the corresponding articles are supplied, the article(s) is/are removed and placed in order loading aid 3 held in readiness. If the picking order provided has been processed, the order loading aid 3 loaded with articles can be discharged from the region of the order-picking workstation and a new order loading aid 3 can be held in readiness in order to process the next picking order.

Deviating from the previously described picking operation it is also conceivable to leave one and the same storage loading aid 2 in the region of the diverting conveyor system 15 until the corresponding number of articles has been placed in all order loading aids 3. If no such identical articles are to be removed from the storage loading aid 2, the latter can be conveyed from the order-picking station 5 and another storage loading aid 2 can be conveyed into the order-picking station 5 in order to pick the articles into the therefore provided order loading aids 3 in a further picking operation. Those order loading aids 3 where no such article is to be placed in, can temporarily be conveyed from the picking circulation, and only those order loading aids 3 are conveyed to the order-picking station 5 where corresponding articles are to be placed in.

The order-picking system 1 comprises an order-picking station 5 which forms the order-picking workstation for the order picker 4. The order-picking station 5 is in conveying engagement via a first conveyor system 6, by means of which both the storage loading aids 2 and the order loading aids 3 are supplied. A second conveyor system 7 serves to convey the storage loading aids 2 as well as the order loading aids 3 away from the order-picking workstation into a not illustrated storage or storage system once a picking operation has been completed.

In the embodiment shown as an example here the first conveyor system 6 comprises a first incoming conveyor device 8 as well as a second incoming conveyor device 9. Consequently, the first conveyor system 6 is distributed among two individual incoming conveyor devices 8 and 9, in which case e.g. the first incoming conveyor device 8 conveys the storage loading aids 2 and the second incoming conveyor device 9 conveys the order loading aids 3 to the order-picking station 5.

The second conveyor system 7 for discharging is here provided in the form of a common outgoing conveyor device 10, which conveys the storage loading aids 2 as well as the order loading aids 3 from the order-picking station 5 to or back to the therefore provided but not illustrated storages or storage systems once a picking order has been processed. Consequently, both of the conveyor systems 6, 7 serve to convey the storage loading aids 2 as well as the order loading aids 3 to the order-picking station 5 and also to convey them from the latter.

It should also be noted that the conveyor systems 6, 7 or the incoming conveyor devices 8, 9 forming the latter as well as the outgoing conveyor devices 10 are only shown in a highly schematic way and may be formed from any conveyor system. These may for instance include roller conveyors, band conveyors, wheel conveyors, multi-track conveyors.

The term loading aids 2, 3 should generally be understood as meaning that the most different components for transporting articles can be included. Thus, the loading aids 2, 3 can e.g. be provided in the form of containers, trays, pallets, boxes or suchlike. The loading aids 2, 3 serve to store the articles or the picked goods as well as to pick up and to transport them during the transport operations.

Depending on the design of the order-picking station 5, an incoming conveyor path 11 or 11' ends at a transfer section 12 or 12' to the order-picking station 5. Due to the fact that the first conveyor system 6 is here provided in the form of the first and the second incoming conveyor device 8 or 9, either of the incoming conveyor device 8, 9 also forms an own incoming conveyor path 11 or 11'. The second conveyor system 7 which serves to discharge both the storage loading aids 2 and the order loading aids 3 starts following an order-picking station 5 in the form of an outgoing conveyor path 13 or 13' at a pick-up section 14, 14'. The transfer sections 12, 12' of the two incoming conveyor devices 8, 9 consequently form their ends by means of which the loading aids 2, 3 are transferred to the order-picking station 5. Within the meaning of the order-picking station 5, the transfer sections 12 or 12' represent a pick-up region of the order-picking station 5. The end of the order-picking station 5 constitutes a pick-up region towards the pick-up sections 14, 14' of the outgoing conveyor device 10 of the second conveyor system 7.

In the embodiment illustrated as example here, the order-picking station 5 comprises several, to be precise two, a first and a second diverting conveyor system 15, 16 disposed one next to the other. In the embodiment selected as an example here, the first diverting conveyor system 15 is assigned to the storage loading aids 2 and the second diverting conveyor system 16 is assigned to the order loading aids 3. It should be mentioned that in this case, the first incoming conveyor device 8 illustrated on the left is provided for transporting the storage loading aids 2 and the second incoming conveyor device 9 is provided for transporting the order loading aids 3, it is however also possible that the storage loading aids 2 are conveyed to the order-picking station 5 by the second incoming conveyor device 9, illustrated on the right, and the order loading aids 3 are conveyed to the order-picking station by the first incoming conveyor device 8, illustrated on the left.

Consequently, the first diverting conveyor system 15 is provided for transporting the storage loading aids 2 in the region of the order-picking station 5. This diverting conveyor system 15 forms a first transport path 17 for the storage loading aids 2 and therefore connects the transfer section 12 of the first conveyor system 6 with its first incoming conveyor device 8 to the pick-up section 14 of the second conveyor system 7 with its common outgoing conveyor device 10. The second diverting conveyor system 16 serves to convey or transport the order loading aids 3 and connects the transfer section 12' of the first conveyor system 6 with its second incoming conveyor device 9 with the pick-up section 14' of the second conveyor system 7 with its common outgoing conveyor device 10 via a further or second transport path 18.

As seen in transport direction, the storage loading aid 2 has a front end 19 which is transported first when the transport is passing through the first incoming conveyor device 8. The order loading aid 3 also has a front end 20, which—also as seen in transport direction—is transported first in the region of the second incoming conveyor device 9 of the first conveyor system 6. Thus, each of the two ends 19, 20 of the two loading aids 2, 3 constitutes a leading end.

The two diverting conveyor systems 15, 16 of this exemplary embodiment are such configured that—as seen in transport direction—the front end 19 of the storage loading aids 2 as well as the front end 20 of the order loading aids 3 each always constitute the front end of the loading aids 2, 3 as seen in transport direction while the aids are being transported onwards along the respective transport paths 17, 18 in the region of the two diverting conveyor systems 15, 16.

In this context, the term diverting the loading aids 2, 3 in the region of the diverting conveyor systems 15, 16 shall mean that at least sections of either of the transport paths 17, 18 in the region of the diverting conveyor systems 15, 16 are designed to be arcuate curved. The embodiment illustrated as an example here provides that both the storage loading aid 2 and the order loading aid 3 are conveyed onwards in the region of the diverting conveyor systems 15, 16 approximately in a section of a circular path. If the loading aid 2, 3 has for example an rectangular plan view this causes that it is always the longer side edge of the loading aid 2, 3 what faces the order picker 4 at his/her order-picking workstation. This provides for an improved intervisibility to the articles to be removed or picked from the storage loading aids 2 as well as an increased space for placing the articles corresponding to the respective picking order in the order loading aids 3.

This arrangement by reference to the order-picking workstation for the order picker 4 causes that the first conveyor system 6, in particular its first and second incoming conveyor device 8, 9, are each arranged to be upstream of the first and second transport path 17, 18 as seen in transport direction of the storage loading aid 2 as well as the order loading aid 3. The second conveyor system 7 with its outgoing conveyor device 10 or its outgoing conveyor devices 27, 28 is arranged to be downstream of the first and the second transport path 17, 18, respectively, as seen in transport direction of the storage loading aid 2 as well as the order loading aid 3. This results in the first and the second conveyor system 6, 7 being arranged on the side facing away or lying opposite the diverting conveyor systems 15, 16 by reference to the order-picking workstation for the order picker 4. In its longitudinal orientation the first transport path 17 of the first diverting conveyor system 15 has a removal section in a region directly adjacent to the order picker 4. In its longitudinal course the second transport path 18 of the second diverting conveyor system 16 has a drop-off section, also disposed in a region directly adjacent to the order picker 4, in which section the articles to be picked are placed into the therefore provided order loading aid 3.

In order to achieve a better guiding of the individual loading aids 2, 3 while they are being transported onwards along the transport paths 17, 18 in the region of the diverting conveyor systems 15, 16 it can be advantageous to provide or dispose additional guide elements 21 on the outside of the diverting conveyor systems 15, 16 as seen by reference to the transport paths 17, 18. These allow the loading aids 2, 3 to be conveyed along the latter, preferably so as to touch them. The conveying of the loading aids 2, 3 in the region of the diverting conveyor systems 15, 16 can for example be carried out by a plurality of individual conveying rollers 22. The arrangement and design of the conveying rollers 22 depend on the loading aids 2, 3 to be transported and/or the orientation or the longitudinal orientation of the transport paths 17, 18 or the conveying paths in the diverting conveyor systems 15, 16. To this end, the conveying rollers 22 can be provided in the form of so-called conveying rollers which are of a relatively small width by reference to their axis of rotation.

One of the conveying rollers 22 in the right lower region of the second diverting conveyor system 16 shows that they are mounted so as to be swiveled or adjusted about an pivot axis or axis of rotation at the diverting conveyor system 16, such as for example a picking table or suchlike. This allows the conveying roller 22 to be adjusted, as circumstances require, about a pivot axis oriented to be perpendicular to the axis of rotation while the loading aids 2, 3 are being transported, in order to exercise an influence on the transport path 17, 18 of the loading aids 2, 3. The pivot axis has an orientation perpendicular with respect to a conveying or transport plane defined by the conveying rollers 22. It is however preferred if the conveying rollers 22 are predominantly arranged to be fixed in the region of the diverting conveyor systems 15, 16.

Providing the diverting conveyor systems 15, 16 in the region of the order-picking station 5 may result in the first and the second conveyor systems 6, 7 being arranged to extend one next to the other. The embodiment illustrated as an example here shows the first and the second conveyor systems 6, 7 running approximately parallel with one another. It would however also be conceivable that the conveyor systems 6, 7 or the incoming conveyor devices 8, 9 constituting the latter or the outgoing conveyor device 10 are aligned angularly to one another. It is for example possible that the first and the second incoming conveyor device 8, 9 are aligned to extend towards one another by reference to the order-picking station 5 and in the direction of the latter. Irrespective of the above it would also be possible to align the incoming conveyor device 8 and/or 9 to extend towards one another starting from the order-picking station 5 in the direction of the side facing away from the latter. Irrespective of the above it would also be possible to provide only one of the incoming conveyor devices 8, 9 in an angular longitudinal extension by reference to the order-picking station 5, in particular the rectilinearly designed front end 23 illustrated here. The same also applies to the second conveyor system 7, in particular the common outgoing conveyor device 10.

As described above already, the first and the second conveyor systems 6, 7 of this exemplary embodiment are disposed on the order-picking station 5 at a side opposite the order-picking workstation and adjacent to the order-picking station 5.

The two incoming conveyor devices 8, 9 for the storage loading aids 2 as well as the order loading aids 3 are in this example arranged outside by reference to the second conveyor system 7 with its outgoing conveyor device 10. The second conveyor system 7 consequently comprises the outgoing conveyor device 10 for discharging the storage loading aids 2 and the order loading aids 3, which outgoing conveyor device 10 at least comprises one common conveyor 24. The outgoing conveyor device 10 with its common conveyor 24 is disposed between the first and second incoming conveyor devices 8, 9 each of which is arranged in a sideway and offset manner. This will consequently lead to the result that the transport paths 17, 18 of the two diverting conveyor systems 15, 16 are aligned to extend towards each other, each starting from the transfer sections 12, 12' of the first and second incoming conveyor devices 8, 9, in the direction of the pick-up section 14, 14' of the outgoing conveyor device 10 with the common conveyor 24.

The two diverting conveyor systems 15, 16 defining an approximately semi-circular transport path 17, 18 cause that also the pick-up sections 14, 14' are spaced apart from one another in vertical direction by reference to the incoming conveyor paths 11, 11' as well as running parallel with the front end 23. In order to be able to transport both the storage loading aids 2 and the order loading aids 3 from the two diverting conveyor systems 15, 16 to the common conveyor 24 of the outgoing conveyor device 10, an accumulating conveyor 25 is arranged directly downstream of the two diverting conveyor systems 15, 16, and with its two pick-up sections 14, 14' spaced apart from each other the accumulating conveyor on the side facing the order-picking station 5 *f* adjoins the two diverting conveyor systems 15, 16. The outgoing conveyor paths 13, 13' adjacent to the pick-up sections 14, 14 are aligned in such a way that they are oriented towards the center of the conveyor 24. It is thus possible for the accumulating conveyor 25 to convey the storage loading aids 2 and the order loading aids 3 from the order-picking station 5 to the common conveyor 24. This is mostly carried out one after the other. Either the storage loading aid 2 or the order loading aid 3 can be selected to be the beginning of the discharging sequence.

In order to be able to provide the order picker 4 in the region of the order-picking workstation of the order-picking station 5 with a better view and a more ergonomic way to collect, grip and place the articles to be picked, it may be advantageous if a conveying plane defined by the diverting conveyor system 15, 16 is aligned to be inclined by reference to a further conveying plane defined by the conveyor systems 6, 7 for supplying and discharging. This being the case, the conveying plane defined by the conveyor systems 6, 7 is preferably aligned to be horizontal. The further conveying plane defined by the diverting conveyor system 15, 16 extends to be inclined in the direction toward the order picker mostly.

When the loading aids 2, 3 are transported from the incoming conveyor devices 8, 9 and transported onwards through the diverting conveyor systems 15, 16 up to the second conveyor system 7 with the common outgoing conveyor device 10, it is therefore guaranteed for both the storage loading aids 2 and the order loading aids 3 to be each transported with their front ends in transport direction as they are being transported along the transport paths 17, 18 in the region of the diverting conveyor systems 15, 16. This means that the container is not required to be turned or rotated by any additional switching station, but is instead steadily transported along the transport path 17, 18 until it has reached the picking position for the order picker 4.

Once this position has been reached, the aimed removal of the article or the articles from the storage loading aid 2 is performed by the order picker 4.

Figure 2:
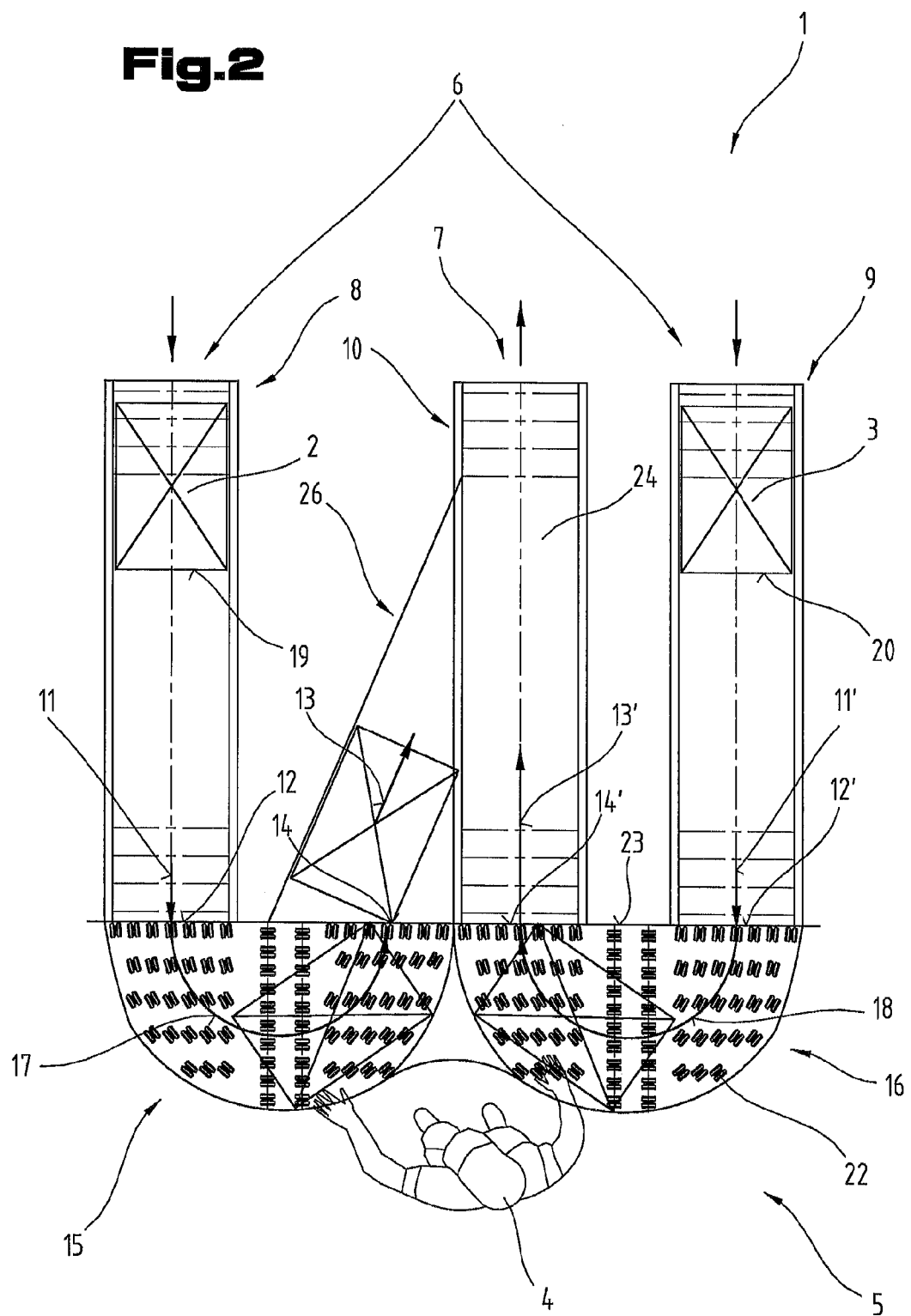
FIG. 2 is a plan view illustrating another possible embodiment of an order-picking system.

FIG. 2 illustrates another embodiment of the order-picking system 1, which may be construed as an independent embodiment in its own right, the same reference numbers and component names being used as those used for FIG. 1 described above. To avoid unnecessary repetition, reference may be made to the more detailed description of FIG. 1 above.

The order-picking system 1 illustrated here has a design similar to that previously described in detail in FIG. 1. This order-picking system 1 also comprises a first as well as a second conveyor system 6, 7. The first conveyor system 6 comprises the first incoming conveyor device 8 for the storage loading aids 2 as well as the second incoming conveyor device 9 for the order loading aids 3. In the region of the diverting conveyor systems 15, 16 the loading aids 2, 3 are transported along the transport paths 17, 18 from the transfer sections 12, 12' up to the pick-up sections 14, 14' where they are picked up by the second conveyor system 7. As opposed to the embodiment described above, no accumulating conveyor 25 is provided here. As a consequence, discharging the order loading aids 3 is carried out by the second diverting conveyor system 16 directly to the conveyor 24 of the common outgoing conveyor device 10 of the second conveyor system 7. The conveyor 24, thus, directly constitutes the pick-up section 14' for the order loading aids 3 supplied by the second diverting conveyor system 16 and discharges the latter along the outgoing conveyor path 13'. An inbound gate conveyor 26 with its pick-up section 14 directly adjoins the first diverting conveyor system 15, which pick-up section 14 with its outgoing conveyor path 13 opens into the further outgoing conveyor path 13' of the common conveyor 24.

Figure 3:
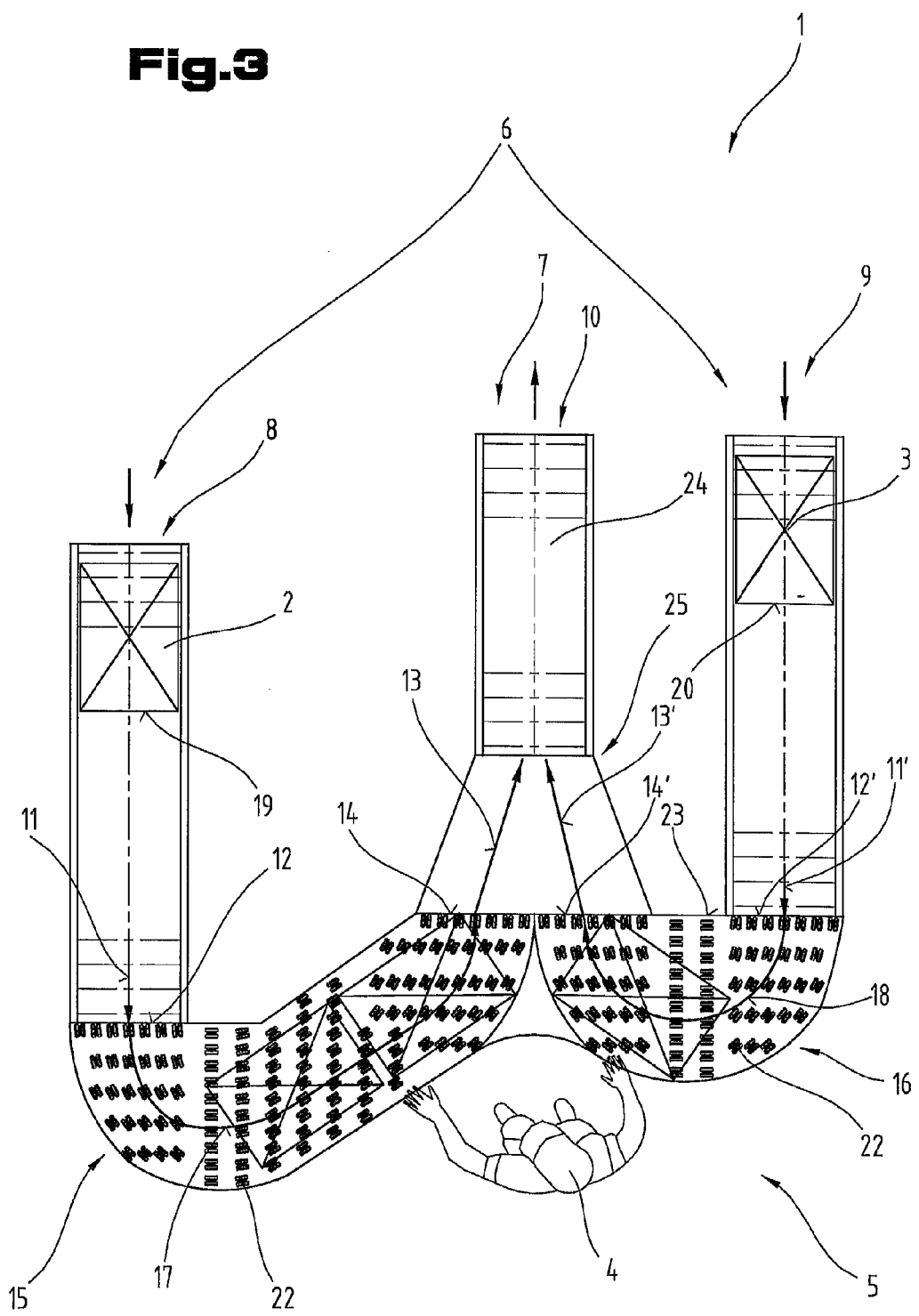
FIG. 3 is a plan view illustrating another possible design of an order-picking system.

FIG. 3 illustrates another embodiment of the order-picking system 1, which may be construed as an independent embodiment in its own right, the same reference numbers and component names being used as those used for FIGS. 1 and 2 described above. To avoid unnecessary repetition, reference may be made to the more detailed description of FIGS. 1 and 2 above.

The embodiment and arrangement of the outgoing conveyor device 10 with its common conveyor 24 as well as the accumulating conveyor 25, the second incoming conveyor device 9 as well as the second diverting conveyor system 16 correspond to the embodiment that was described in FIG. 1 already.

In order to be able to make available a larger number of loading aids—in the present example the storage loading aids 2—in the region of the first diverting conveyor system 15, the transport path 17 is such selected that it is configured to be rectilinear in the region of the diverting conveyor system 15 at a side facing the order picking workstation. It should be noted that the arrangement of the at least partially rectilinear embodiment of the transport path 17 is also conceivable in terms of the order loading aids 3 as this will allow even more order loading aids 3 to be made available in the region of the order-picking workstation of the order-picking station 5.

Irrespective of the above it is also possible to provide this rectilinear transport path for configuring the transport path 17 and/or 18 in the region of both diverting conveyor systems 15, 16.

Figure 4:
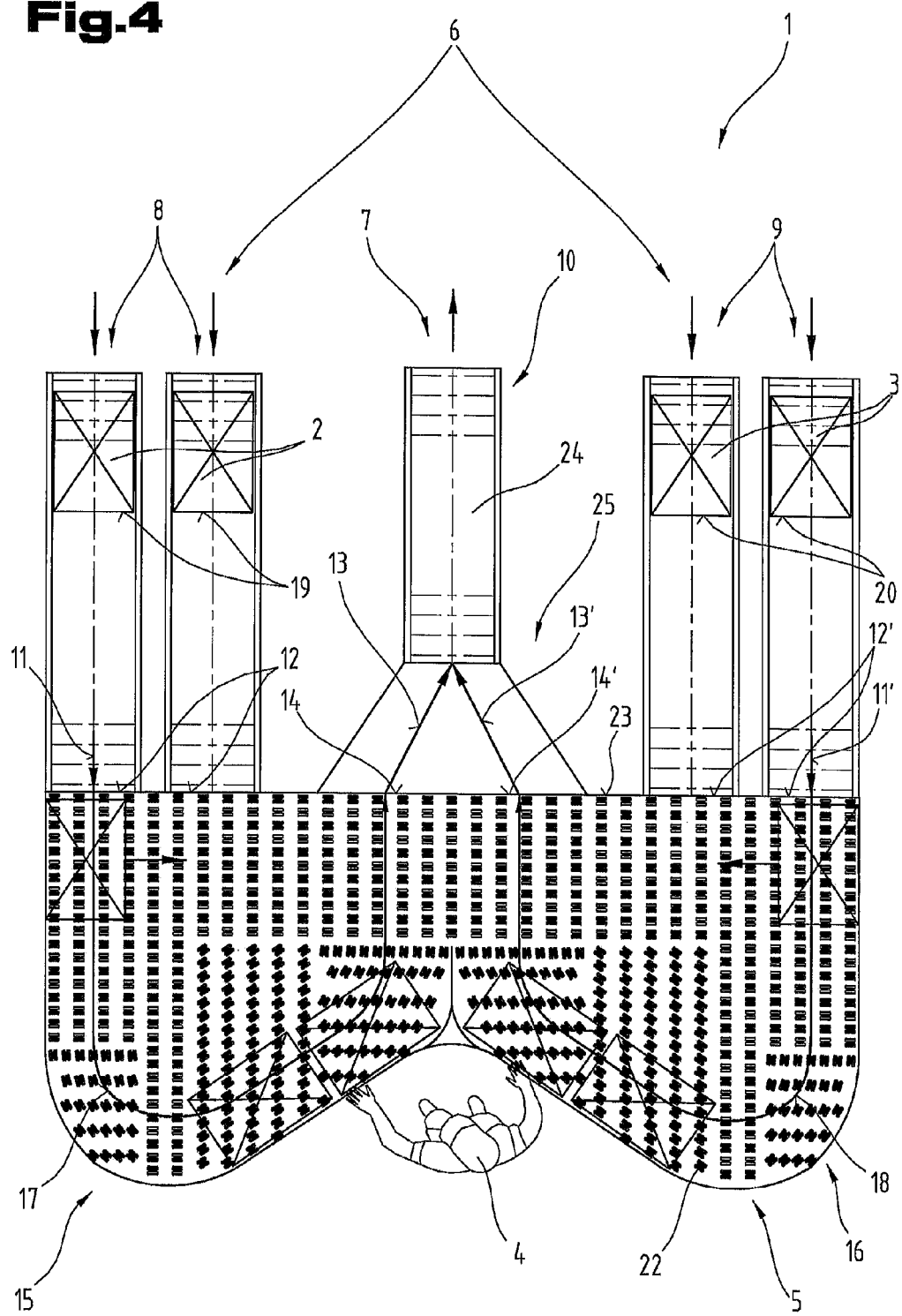
FIG. 4 is a plan view illustrating another possible design of an order-picking system with several incoming conveyor devices.

FIG. 4 illustrates another embodiment of the order-picking system 1, which may be construed as an independent embodiment in its own right, the same reference numbers and component names being used as those used for FIGS. 1 to 3 described above. To avoid unnecessary repetition, reference may be made to the more detailed description of FIGS. 1 to 3 above.

FIG. 4 shows the order-picking system 1 also comprising the first conveyor system 6 or the second conveyor system 7. In order to achieve a high flexibility for the supply of the storage loading aids 2 and/or the order loading aids 3 it is here provided that the first conveyor system 6 comprises several first incoming conveyor devices 8 for the storage loading aids 2 and/or several second incoming conveyor devices 9 for the order loading aids. In the present embodiment illustrated as an example, a symmetrical arrangement of the respective first incoming conveyor devices 8 as well as the second incoming conveyor devices 9 by reference to the second conveyor system 7 with the outgoing conveyor device 10, in particular its common conveyor 24, is selected.

It should be noted that it is preferred if the conveying rollers 22 of these diverting conveyor systems 15, 16 are mounted to a base frame, in particular a picking table, so as to be swiveled or rotated, and their position in the direct vicinity to the transfer sections 12, 12' and the pick-up sections 14, 14' are illustrated in a position allowing the transverse transport of the loading aids 2, 3. In order for the loading aids 2, 3 to be directly transported onwards from the first and second incoming conveyor devices 8, 9, the conveying rollers 22 are to be adjusted into a position pivoted by 90° for achieving the transport paths 17, 18.

The two diverting conveyor systems 15, 16 constitute the order-picking station 5 for the order picker 4, which order-picking station is made of a plurality of rollers or conveying rollers 2 for forming the conveying plane in this region. This possible pivotable mounting or fixture of the individual conveying rollers 22 in the region of the diverting conveyor systems 15, 16 provides for a high extent of flexibility or variability for switching and or transporting onward the individual loading aids 2, 3 in the region of the order-picking station 5. This allows not only a continuous or uninterrupted transport path 17, 18 to be achieved but it is also possible for individual loading aids 2, 3 to be transported in a shifted manner, crossed and/or replaced if necessary.

Attention should also be paid to the fact that the front end 19, 20 of the loading aids 2, 3 as seen in transport direction is always the leading end of the loading aids 2, 3.

Figure 5:
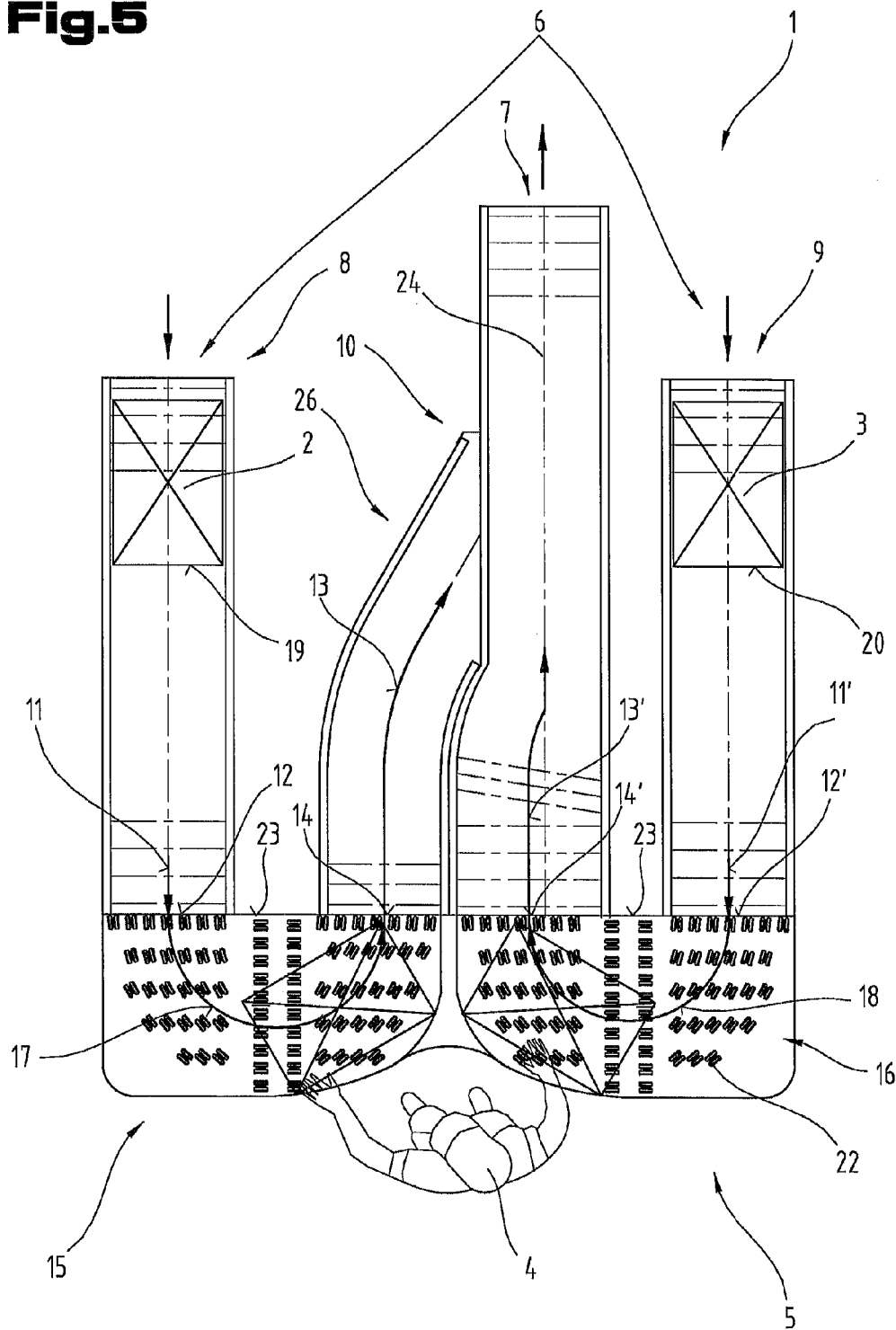
FIG. 5 is a plan view illustrating another possible design of an order-picking system.

FIG. 5 illustrates another embodiment of the order-picking system 1, which may be construed as an independent embodiment in its own right, the same reference numbers and component names being used as those used for FIGS. 1 to 4 described above. To avoid unnecessary repetition, reference may be made to the more detailed description of FIGS. 1 to 4 above.

FIG. 5 shows a variant of the order-picking system 1 as it was already described in FIG. 2 by means of the inbound gate conveyor 26.

The outgoing conveyor device 10 with its common conveyor 24 of the embodiment shown here is arranged to be directly adjoining the second diverting conveyor system 16. In the direct vicinity to the front end 23 of the order-picking station 5, the connection of the conveyor 24 with its pick-up section 14' is embodied to be wider as seen transverse to the conveying direction than at its end facing away from the order-picking station 5 as seen in transport direction. Sections of the inbound gate conveyor 26 are configured to have an arcuate curved outgoing conveyor path 13 which is embodied to be rectilinear in the direct connection region to the pick-up section 14 as well as in its section opening into the outgoing conveyor path 13' of the conveyor 24. It is therefore possible that a directed discharge of the loading aids 2 and/or 3 is carried out, depending on which loading aid 2, 3 the inbound gate conveyor 26 is assigned to.

It is furthermore illustrated in the region of the order-picking station 5 that the two diverting conveyor systems 15, 16 with their picking tables not described in more detail do not have arcuate curved outer faces for mounting or receiving the conveying rollers 22, but that they are rather designed to extend rectilinear in the region adjoining the two incoming conveyor devices 8, 9.

Figure 6:
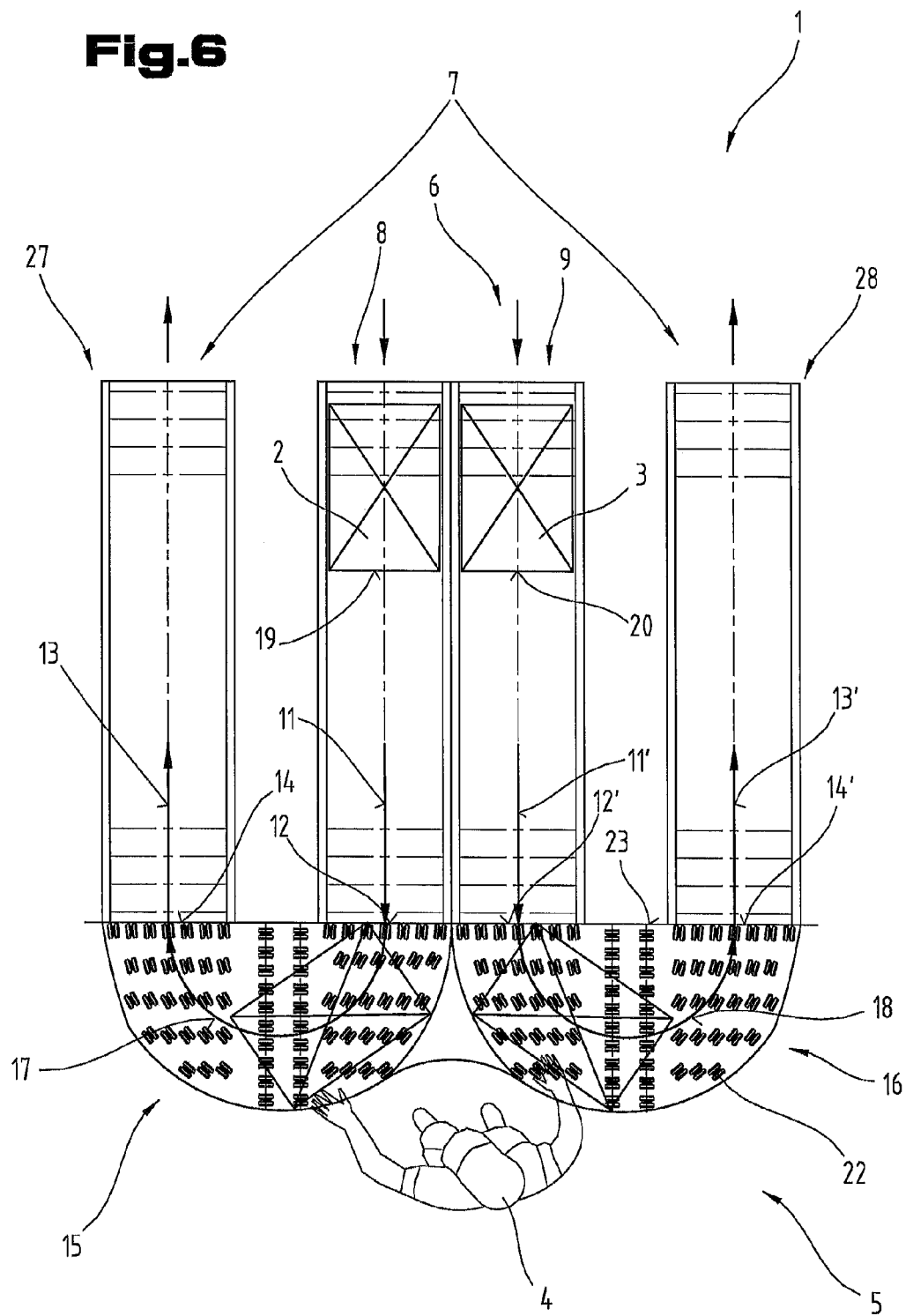
FIG. 6 is an order-picking system with infeed and outgoing conveyor devices each connected to each other in conveying engagement via diverting conveyor systems.

FIG. 6 illustrates another embodiment of the order-picking system 1, which may be construed as an independent embodiment in its own right, the same reference numbers and component names being used as those used for FIGS. 1 to 5 described above. To avoid unnecessary repetition, reference may be made to the more detailed description of FIGS. 1 to 5 above.

FIG. 6 illustrates the order-picking system 1 with the two conveyor systems 6, 7 for supplying and discharging the storage loading aids 2 as well as their order loading aids 3. For the discharging operation carried out by the second conveyor system 7 a first outgoing conveyor device 27 is provided for the storage loading aids 2 and a second outgoing conveyor device 28 is provided for the order loading aids 3. This allows the storage loading aids 2 and the order loading aids 3 of this example to be supplied to the order-picking station 5 independent of each other and to be in turn discharged independent of each other by the two outgoing conveyor devices 27, 28 once the picking operation is complete. As opposed to the above-described order-picking systems 1 the two outgoing conveyor devices 27, 28 here are arranged at the outer face of the two diverting conveyor systems 15, 16 adjoining the order-picking system 5 in order to form the second conveyor system 7. In this case, the first conveyor system 6 with the two incoming conveyor devices 8, 9 is arranged between the two outgoing conveyor devices 27, 28. This causes that the two loading aids 2, 3 are made available in the center. On sides each facing away from one another in the region of the order-picking station 5 the latter are conveyed onwards once the picking operation has been completed and discharged or conveyed away by means of the two outgoing conveyor devices 27, 28 situated outside.

FIG. 7 shows a simplified diagram of the order-picking system 1 according to FIG. 1, in particular the order-picking station 5, but showing the difference that one of the diverting conveyor systems, namely the first diverting conveyor system 15, for the storage loading aid 2, not shown in detail, is designed to be inclined at least in that section of the first transport path 17 facing the order picker 4. Furthermore, the diverting conveyor systems 15, 16 are not embodied as a table-shaped, continuous transport plane, but they rather constitute own conveying tracks each, the front ends 19, 20 of which—as seen in transport direction—transport both the storage loading aid 2 and the order loading aid 3 first. The transport tracks are schematically indicated by means of transverse lines and may be provided in the form of conveying means known from prior art.

This is illustrated in a simplified way by means of arrows, which run towards the outer edge of the first diverting conveyor system 15. The inclination of the conveying plane of the diverting conveyor system 15 serves to tilt or incline the storage loading aid 2 or storage loading aids 2 present in the region of the first diverting conveyor system 15 in order to not only provide the order picker 4 with a better view into the storage loading aid 2 but also to facilitate the handling or the removal of the articles to be removed from the storage loading aid 2. A horizontally oriented plane is understood to be the reference plane in the region of the two conveyor systems 6, 7.

Said inclining or tilting of the storage loading aids 2 in the region of the first diverting conveyor system 15 can e.g. be achieved by embodying the side or section of the first diverting conveyor system 15 positioned to be closer to the first conveyor system 6 or facing it in such a way that it extends circumferentially so as to be elevated. A further possibility is to embody the outer circumferential edge of the diverting conveyor system 15 with respect to the conveying plane formed from the first conveyor system 6 so as to be recessed and consequently lowered. This lowering can be carried out in a continuous way, in which case the connection of the first diverting conveyor system 15 in a horizontally oriented plane takes place in the transfer section 12 of the first incoming conveyor device 8. Subsequently, the longitudinal course of the first transport path 17 can be configured so as to be inclined, in particular twisted, and in this case there is a continuous transition starting from the horizontal plane reaching up to the inclined transport plane in the region of the first diverting conveyor system 15 and back again to a horizontal plane, preferably also situated in the same conveying plane, up to the outgoing conveyor path 13. By reference to the transport path 17 and the horizontal conveying plane in the region of the first conveyor system 6 it can also be said that there is a winding or twisted conveying path.

Irrespective of the above, said tilting or inclining of the storage loading aids 2 would also be possible for the order loading aids 3 in the region of the second transport path 18 of the second diverting conveyor system 16. This is, however, not illustrated here in detail, but inclining the storage loading aids considerably facilitates preferably the removal of the conveying goods or the goods to be removed from the storage loading aid 2 is facilitated considerably for the order picker 4. The discharge can also be carried out into an order loading aid 3 horizontally transported in the conveying plane in the region of the second diverting conveyor system 16.

This inclination or inclined conveying of the storage loading aids 2 in the region of the first diverting conveyor system 15 could however also be carried out by the transport path 17 being performed in a further transport plane which extends to be continuously inclined with respect to the transport plane formed from the first conveyor system 6. It is thus possible that the transition section 12 as well as the pick-up section 14 is situated on the same height level as seen in vertical direction. In order to avoid a jerky, quick switching of the individual storage loading aids 2 from the first conveyor system 6, in particular the first incoming conveyor device 8, onto the first diverting conveyor system 15 it is possible to provide a bow-shaped transfer section 29 between the first diverting conveyor system 15 and the directly adjacent first and second conveyor system 6, 7. This is illustrated in FIG. 8 in a simplified manner.

It should also be noted that the conveyor 24 in the FIGS. 7 and 8 is illustrated in a simplified schematic manner only and the remaining components of the system have not been illustrated for clarity reasons.

For the sake of good order, finally, it should be pointed out that, in order to provide a clearer understanding of the structure of the order-picking station 1, it and its constituent parts are illustrated to a certain extent out of scale and/or on an enlarged scale and/or on a reduced scale.

The object on which the independent approaches according to the invention have been based can be derived from the description.

All statements regarding value ranges in the present description are to be understood in such a way that they also include any and all partial ranges arising from them. For example, the statement of 1 to 10 is to be understood as including all partial ranges starting from the lower limit 1 and the upper limit 10, i.e., all partial ranges begin with a lower limit of one or more and end at an upper limit of 10 or less, e.g., 1 to 1.7 or 3.2 to 8.1 or 5.5 to 10.

The embodiments illustrated as examples represent possible variants of the order-picking system 1, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable design variants which can be obtained by combining individual details of the design variants described and illustrated are possible and fall within the scope of the invention. Furthermore, individual features or combinations of features of the different exemplary embodiments shown and described here may constitute independent approaches according to the invention on their own.

In particular the individual embodiments illustrated in FIGS. 1; 2; 3; 4; 5; 6; 7; 8 form the subject matter of independent approaches according to the invention. The problems and solutions in this regard according to the invention can be derived from the detailed descriptions of these figures.

LIST OF REFERENCE NUMERALS 1 order-picking system
2 storage loading aid
3 order loading aid
4 order picker
5 order picking station
6 first conveyor system
7 second conveyor system
8 first incoming conveyor device
9 second incoming conveyor device
10 outgoing conveyor device
11, 11' incoming conveyor path
12, 12' transfer section
13, 13' outgoing conveyor path
14, 14' pick-up section
15 first diverting conveyor system
16 second diverting conveyor system
17 first transport path
18 second transport path
19 end
20 end
21 guide element
22 conveying roller
23 front end
24 conveyor
25 accumulating conveyor
26 inbound gate conveyor
27 first outgoing conveyor device
28 second outgoing conveyor device
29 transition section

The invention claimed is:

1. Order-picking system (1) for picking articles from storage loading aids (2) into order loading aids (3) by an order picker (4) at an order-picking station (5), comprising:
 a first conveyor system (6) for supplying the storage loading aids (2) as well as the order loading aids (3),
 a second conveyor system (7) for discharging the storage loading aids (2) as well as the order loading aids (3),
 the order-picking station (5) connected to the first conveyor system (6) and the second conveyor system (7),
 a first transfer section (12) at the first conveyor system (6) adjacent to the order-picking station (5) and the transferring storage loading aids (2),
 a second transfer section (12') at the first conveyor system (6) adjacent to the order-picking station (5) and for transferring order loading aids (3),
 a first pick-up section (14) at the second conveyor system (7) adjacent to the order-picking station (5) and for transferring storage loading aids (2),
 a second pick-up section (14') at the second conveyor system (7) adjacent to the order-picking station (5) and for transferring order loading aids (3),
 wherein the order picking station (5) comprises a first diverting conveyor system (15) and a second diverting conveyor system (16),
 the first diverting conveyor system (15) connects the first transfer section (12) with the first pick-up section (14) via a first transport path (17), at least sections of which are embodied to be arcuate curved, and
 the second diverting conveyor system (16) connects the second transfer section (12') with the second pickup section (14') via a second transport path (18), at least sections of which are embodied to be arcuate curved, and
 the first and second diverting conveyor systems (15, 16) are each configured in such a way that a front end (19) of the storage loading aids (2) as well as a front end (20) of the order loading aids (3) always from the front end of the loading aids (2, 3) as seen in transport direction while they are being transported onwards along the transport paths (17, 18) in the region of the first and second diverting conveyor systems (15, 16).

2. Order-picking system (1) according to claim 1, wherein the first and the second conveyor system (6, 7) are arranged so as to extend one next to the other.

3. Order-picking system (1) according to claim 1, wherein the first and the second conveyor system (6, 7) are disposed in an arrangement approximately parallel with one another.

4. Order-picking system (1) according to claim 1, wherein the first and the second conveyor system (6, 7) are arranged at a side of the order-picking station (5) opposite the order-picking workstation for the order picker (4) and adjoining the order-picking station (5).

5. Order-picking system (1) according to claim 1, wherein the transport path (17, 18) in the region of the diverting conveyor system (15, 16) and at a side facing the order picker (4) at least in sections is configured to be rectilinear.

6. Order-picking system (1) according to claim 1, wherein the first and the second conveyor system (6, 7) define a first conveying plane, and the diverting conveyor system (15, 16) define a second conveying plane, the second conveying plane is inclined with respect to the first conveying plane.

7. Order-picking system (1) according to claim 1, wherein additional guide elements (21) are arranged or provided on the diverting conveyor systems (15, 16) next to the transport paths (17, 18).

8. Order-picking system (1) according to claim 1, wherein the first conveyor system (6) comprises a first incoming conveyor device (8) for the storage loading aids (2) as well as a second incoming conveyor device (9) for the order loading aids (3).

9. Order-picking system (1) according to claim 8, wherein the first conveyor system (6) comprises several first incoming conveyor devices (8) for the storage loading aids (2) as well as several second incoming conveyor devices (9) for the order loading ads (9).

10. Order-picking system (1) according to claim 1, wherein the second conveyor system (7) comprises a first outgoing conveyor device (27) for the storage loading aids (2) as well as a second outgoing conveyor device (28) for the order loading aids (3).

11. Order-picking system (1) according claim 10, wherein both the first and the second outgoing conveyor device (27, 28) of the second conveyor system (7) adjoin the outside of the two diverting conveyor systems (15, 16) of the order-picking station (5) and the first conveyor system (6) is arranged between the two outgoing conveyor devices (27, 28).

12. Order-picking system (1) according to claim 1, wherein the diverting conveyor system (15, 16) is provided in the form of a plurality of individual conveying rollers (22).

13. Order picking system (1) according to claim 12, wherein at least one single of the conveying rollers (22) is mounted so as to be displaceable about a pivot axis which is aligned to be perpendicular to the conveying plane defined by the diverting conveyor system (15, 16).

14. Order-picking system (1) according to claim 1, wherein the second Conveyor system (7) comprises a first outgoing conveyor device (10) with a common conveyor (24) for both the storage loading aids (2) and the order loading aids (3).

15. Order-picking system (1) according to claim 14, wherein the outgoing conveyor device (10) with its common conveyor (24) is disposed between the first and second incoming conveyor devices (8, 9) each of which is disposed in a laterally offset arrangement thereto.

16. Order-picking system (1) according to claim 14, wherein the outgoing conveyor device (10) comprises the common conveyor (24) and an accumulating conveyor (25), the accumulating conveyor (25) is arranged directly downstream of the diverting conveyor systems (15, 16) and having the first pick-up section (14) and the second pick-up section (14'), the first and second pick-up sections (14, 14') facing the order-picking system (5) are spaced apart from each other and adjoin the diverting conveyor systems (15, 16), and by means of the accumulating conveyor (25) both the storage loading aids (2) and the order loading aids (3) can be conveyed from the order-picker station (5) to the common conveyor (24) one after the other.

17. Order-picking system (1) according to claim 14, wherein the outgoing conveyor device (10) comprises the common conveyor (24) and an inbound gate conveyor (26) connected to a side of the outgoing conveyor path (13') of the common conveyor (24), and the inbound gate conveyor (26) having the first pick-up section (14) and the common conveyor (24) having the second pick-up section (14'), the first pick-up section (14) of the inbound gate conveyor (26) adjoins one of the diverting conveyor systems (15, 16), and the second pick-up section (14') of the common conveyor (24) adjoins the other one of the diverting conveyor systems (16, 15).

18. A method for picking articles from storage loading aids (2) into order loading aids (3) by an order picker (4) at an order-picking station (5) according to picking orders comprising:
(a) supplying the storage loading aids (2) as well as the order loading aids (3) at the order-picking station (5) by means of a first conveyor system (6),
(b) discharging the storage loading aids (2) as well as the order loading aids (3) from the order picking station (5) by means of a second conveyor system (7),
(c) providing a first transfer section (12) at the first conveyor system (6) adjacent to the order-picking station (5),
(d) providing a second transfer section (12') at the first conveyor system (6) adjacent to the order-pinking station (5),
(e) providing a first pick-up section (14) at the second conveyor system (7) adjacent to the order-picking station (5),
(f) providing a second pick-up section (14') at the second conveyor system (7) adjacent to the order-picking station (5),
(g) transporting the storage loading aids (2) by means of a first diverting conveyor system (15) from the first transfer section (12) to the first pick-up section (14) along an at least in sections arcuate curved first transport path (17), and
(h) transporting the order loading aids (3) by means of a second diverting conveyor system (16) from the second transfer section (12') to the second pick-up section (14') along an at least in sections arcuate curved second transport path (18),
wherein both the storage loading aids (2) and the order loading aids (3) as they are being transported along the transport paths (17, 18) in the region of the diverting conveyor (15, 16) are each transported with their front ends (19, 20) in transport direction and
(i) providing a storage loading aid (2) of the storage loading aids (2) along the first transport path (17),
(j) providing an order loading aid (3) of the order loading aids (3) along the second transport path (18),
(k) removing an article from the storage loading aid (2) by the order picker, and
(l) placing the article on the order loading aid (3) by the order picker by performing a simple swivel movement of the body.

19. The method according to claim 18, wherein the storage loading aid (2) and the order loading aid (3) are conveyed along the transport paths (17, 18) in such a manner that a longer side edge of the storage loading aid (2) and order loading aid (3), each having a rectangular plan view, face the order picker (4).

20. The method according to claim 18, the method further comprising:
(a) providing a first incoming conveyor path (11) on the first conveyor system (6), the first transfer section (12) is constituted by the first incoming conveyor path (11),
(b) providing a second incoming conveyor path (11') on the first conveyor system (6), the second transfer section (12') is constituted by the second incoming conveyor path (11'),
(c) providing an accumulating conveyor (25) on the second conveyor system (7), the first pick-up section (14) and the second pick-up section (14') is constituted by the accumulating conveyor (25),
(d) transporting the storage loading aid (2) from the first transfer section (12) at the first incoming conveyor path

(11) along the first transport path (17) to the first pick-up section (14) at the accumulating conveyor (25),
(e) transporting the order loading aid (3) from the second transfer section (12') at the second incoming conveyor path (11') along the second transport path (18) to the second pick-up section (14') at the accumulating conveyor (25) and afterwards
(f) merging the storage loading aid (2) and the order loading aid (3) by the accumulating conveyor (25), and
(g) conveying the storage loading aid (2) and the order loading aid (3) from the accumulating conveyor (25) onto a common conveyor.

* * * * *